US006411965B2

(12) United States Patent
Klug

(10) Patent No.: US 6,411,965 B2
(45) Date of Patent: Jun. 25, 2002

(54) REMOTE MULTI-USER EDITING SYSTEM AND METHOD TRANSMITTING EDIT DISPLAY INFORMATION

(75) Inventor: John R. Klug, Denver, CO (US)

(73) Assignee: EdiSync Systems LLC, Lakewood, CO (US)

(*) Notice: Subject to any disclaimer, the term of this patent is extended or adjusted under 35 U.S.C. 154(b) by 0 days.

(21) Appl. No.: 09/139,194

(22) Filed: Aug. 25, 1998

Related U.S. Application Data

(63) Continuation of application No. 07/975,905, filed on Nov. 12, 1992, now Pat. No. 5,799,320, which is a continuation of application No. 07/397,996, filed on Aug. 23, 1989, now abandoned.

(51) Int. Cl.[7] .............................................. G06F 17/30
(52) U.S. Cl. ...................... 707/201; 707/540; 709/204
(58) Field of Search ............................... 707/201, 546; 709/204

(56) References Cited

U.S. PATENT DOCUMENTS

| | | | |
|---|---|---|---|
| 3,534,338 A | * 10/1970 | Christensen et al. | ........ 364/900 |
| 4,633,430 A | 12/1986 | Cooper | ........................ 364/900 |
| 4,641,274 A | 2/1987 | Swank | ........................ 364/900 |
| 4,901,223 A | * 2/1990 | Rhyne | ........................ 710/73 |
| 4,924,434 A | * 5/1990 | Christenson et al. | ........... 710/6 |
| 5,008,853 A | 4/1991 | Bly et al. | ..................... 364/900 |
| 5,014,267 A | 5/1991 | Tompkins et al. | ............. 370/62 |
| 5,173,854 A | 12/1992 | Kaufman et al. | ............ 364/419 |
| 5,206,934 A | 4/1993 | Naef, III | ...................... 395/200 |
| 5,280,583 A | 1/1994 | Nakayama et al. | .......... 395/200 |
| 5,300,943 A | 4/1994 | Jakobs et al. | ................... 345/1 |

OTHER PUBLICATIONS

US West Report, "Blazing New Trails in ISDN".
"The BBN Slate Document Communications System", System and Technologies Corporation, 1988.
McNeel, R., "Being There: Remote", pp. 52–57, Dec. 1988.
Kosiur, D., "Communicating at Speed", MacWorld, pp. 128–133, Jul. 1989.
Farallon Computing, Inc., "Timbuktu/Remote User's Guide", pp. 5–8, Berkeley, California.
Pepper, J., "Hayes Revs Up Its Modem: V–Series Features 9600 Baud", Lotus, pp. 20–21, Jan. 1988.
Buerger, D., "Buyers Must Bone Up on Complexities of 9600 bps Modem Technology", Infoworld, p. 18, Dec. 7, 1987.

* cited by examiner

Primary Examiner—Jack M Choules
(74) Attorney, Agent, or Firm—Dorsey & Whitney LLP

(57) ABSTRACT

The user of any of a plurality of personal computers linked over an analog or digital network is able to edit a file in one of the personal computers. This one personal computer is a personal computer capable of multi-tasking which effectively permits multi-user access to the file. The host personal computer effectively performs polling of the remote personal computers for input to be added to the file or functions to be performed on the file. In the analog configuration, the personal computers use high-speed modems and data compression/decompression techniques.

35 Claims, 7 Drawing Sheets

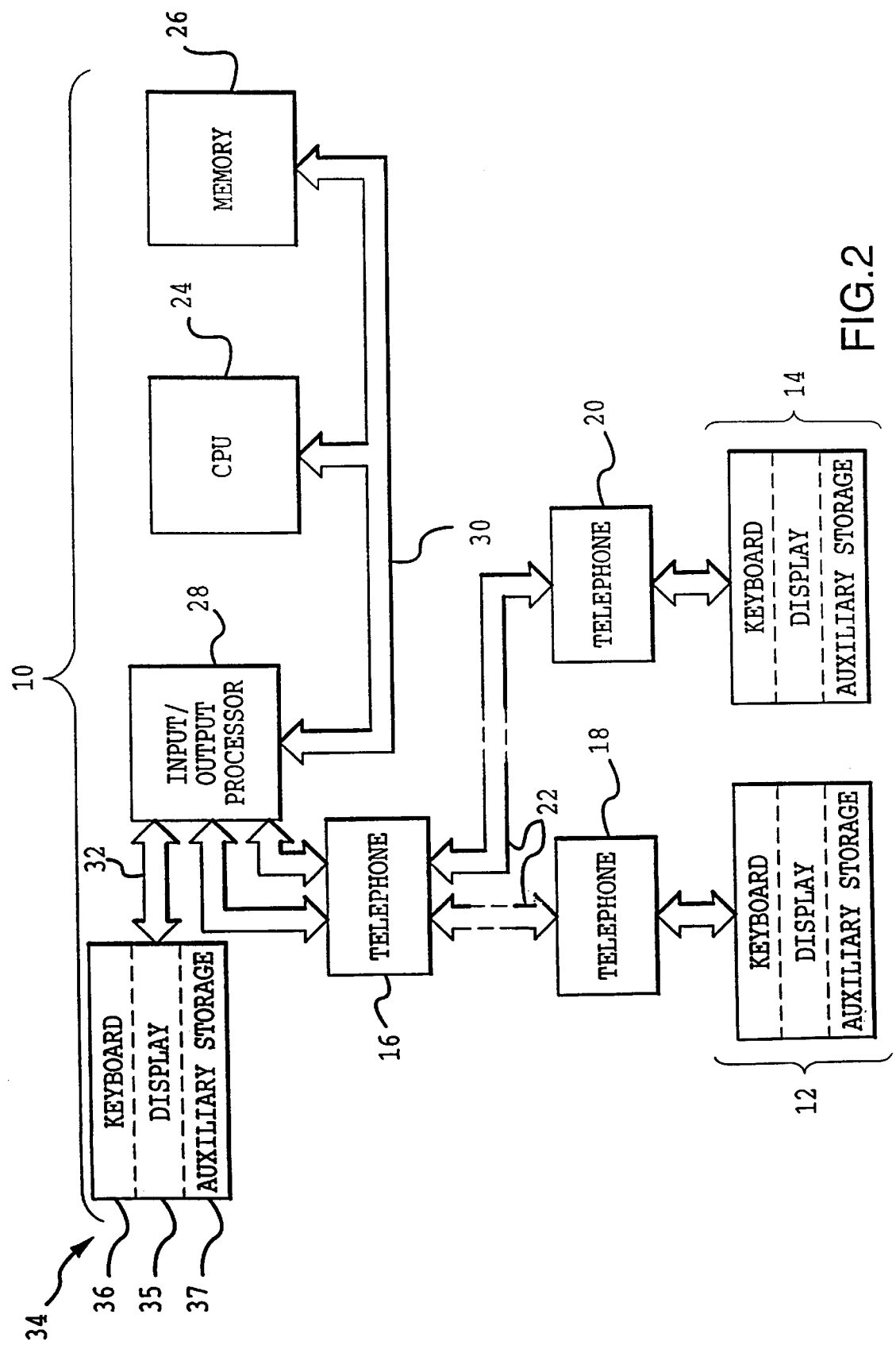

REMOTE MULTI-USER EDITING SYSTEM AND METHOD TRANSMITTING EDIT DISPLAY INFORMATION

RELATED APPLICATION DATA

This application is a continuation of application Ser. No. 07/975,905, filed Nov. 12, 1992 now U.S. Pat. No. 5,799,320 which is a continuation of application Ser. No. 07/397,996, filed Aug. 23, 1989, Abandoned.

BACKGROUND OF THE INVENTION

1. Field of the Invention

The present invention relates to a system and method which allows any one of a plurality of users to interactively edit, in real time, a given graphics and/or text/data file. More particularly, the present invention relates to a system and method which permit any or all of a plurality of users at remotely located personal computers to edit a file resident in one of the computers.

2. Description of the Related Art

For hundreds of years, authors have, had to rely on highly skilled craftsmen to convert their hand-written or type-written manuscripts and artistic renderings into typeset galleys and artwork suitable for reproduction by printing. Yet, most recently, centuries of skill and tradition have been overturned by a new development in the computer industry called desktop publishing.

Desktop publishing has become possible due to the ever increasing power of personal computers, new and affordable output devices such as laser printers, and more powerful software, including page description languages, such as Postscript. Desktop publishing can now allow an individual or business to quickly and inexpensively produce attractive and professional newsletters, brochures, reports, advertisements, etc., using a single personal computer workstation.

It follows that, since expensive typesetting and printing equipment is no longer necessary to produce professional looking printed products, an entire new industry has opened up for small graphics and publishing businesses to produce affordable, custom-tailored, professional-looking, printed products for a wide variety of individual and corporate clients. An example of one such industry where desktop publishing has opened significant new opportunities is the production of periodic publications, e.g. the newsletter industry.

Newsletters are periodical publications which contain news or information, usually of a timely nature, which is of interest to a specific group of people. Businesses often use newsletters for promotional purposes and/or to keep in touch with existing clients, or to motivate and/or inform their own employees.

Frequently, rather than produce a newsletter itself, a business will contract with a specialized outside newsletter publisher to write, edit, typeset copy, produce final art, and print the completed newsletter. In this case, the newsletter publisher will most likely provide a basic graphic format for the newsletter, and will also be in possession of particular articles which will be of interest to a variety of readers. For example, an article providing financial advice would be suitable for newsletters that several different banks might wish to provide to their clients. An article designed to motivate employees would be suitable for newsletters that many different companies may wish to provide to their own employees.

It is critical to note, however, that in almost all cases the graphics and editorial content each corporate customer's newsletter must be custom tailored to that individual corporate customer. And while the actual production of the newsletter has been made more economical with the development of desktop publishing, a major new problem has emerged, which is how to perform effective editing of the newsletter in a timely fashion when the publisher and the customer are remotely located. Obviously, it is imperative that the customer be happy with the final product, and yet, the time required for the interactive editing process cannot be so lengthy as to cause the information contained in the newsletter to become stale.

The problem of timing and coordination of this editing process becomes exponentially acute when, as is often the case, more than two approval entities are involved at different locations. For example, at a client bank the newsletter publisher may need to coordinate and get input/approvals from three or more separate departments such as marketing, legal and branch administration. Or, another example is the client may be at one location, say Kansas City. The newsletter firm is in Denver and the client's advertising agency, which is also involved in the project, is in San Francisco.

One method for the remote editing of a newsletter at one or more remote locations has been for the newsletter publisher to actually send a computer diskette having the newsletter stored thereon by mail to its customer. The customer then reviews the newsletter on its own personal computer and makes any desired changes. However, this method requires a relatively sophisticated customer, and can be time consuming, especially if more than two mailings of the diskette is necessary. Inevitably, information in the newsletter may become stale, and deadlines for periodical newsletters—particularly weekly and monthly newsletters—become difficult to meet.

A second method for the remote editing of a newsletter has been performed utilizing dedicated facsimile machines, and/or PCs which are capable of sending and receiving facsimiles through software, added hardware and modems. According to this method, the newsletter publisher sends a hard copy version of the newsletter to the customer via its facsimile machine. The customer then indicates any desired changes on the proposed newsletter, and sends a copy of the edited newsletter back to the newsletter publisher by facsimile. This editing method, too, can take several exchanges, given the uneven quality of transmission, misinterpretation of editing notes, and normal office delays in routing, actually reviewing, and forwarding documents, until the newsletter meets the customer's approval.

A third method has been the use of telephone conversations with the customer, and via a conference call if more than two parties are involved. This by itself is the weakest of the three methods. As each person does not actually see the newsletter, misunderstandings are bound to occur, resulting in a dissatisfied customer. Using telephone conversations to augment the first two methods is an improvement, but each person may not have the latest version of the newsletter before them, and it is not a cure-all.

The inventor of the present invention believes the most desirable editing method is for all parties involved with both the customer and the publisher to be able to simultaneously view and interactively edit the graphics and/or text of the proposed newsletter as stored in the publisher's personal computer on their respective personal computers. Heretofore, the technology has not been available for even considering such a system on the personal computer level.

To be sure, remote information transfer has been possible for some time, including smoke signals, semaphore and telegraphy. In the computer context, however, data transfer has been predominantly one-way, and point-to-point. Similar to a water pipe, when the spigot is opened at the receiving end, a first computer can pump data in a one-way flow to a second computer. Later on, the second computer can reverse the process, and send data back to the first computer. As can be seen, however, it is almost always a start/stop discontinuous process and also point-to-point involving usually only two computers.

Recently, software has been introduced that permits the user to view the operations of a second computer and, in some cases, to even control that second computer if necessary. Such software has been useful in remote troubleshooting and software diagnostics. In this case, data is transferred point-to-point between the two computers by conventional data transfer means, such as over a standard telephone line using modems at each location. While it is conceivable that such software could permit the user of a second personal computer at a remote location to view work being performed on a file by the user of first personal computer, drawbacks to this method of potential newsletter editing are several.

First, the method would normally only work with two users. The software is not designed to support a plurality of users at separate remote locations. Second, data transfer speed is slow, effectively inhibiting transmission of bit mapped graphics and color images. Third is that only one user at a time may edit a file. Fourth is that such software is commonly acknowledged to be slow, and especially ill-behaved with inevitable data collisions and data contamination unless operated according to strict and tedious protocols. The significance of these drawbacks is further discussed below.

It is a well-established principal in cognitive psychology that, in order to maintain perception, changes in stimulation are necessary. Accordingly, after initially reading a screen of data, if the non-active user at the remote second personal computer stares at a static screen for an extended period of time, he will lose perception. When relatively large amounts of data or updates are sent at once to the second or a third personal computer, the context of the new data will very likely be unclear to the non-active user who has lost perception, and it can take some time before the non-active user regains perception and realizes the context of the new data or updates. Further, using the available software packages, the non-active user of the second personal computer can only observe changes that have been made by the active user of the first personal computer. The non-active user is not able to access the first personal computer to edit the file while the active user is in control. In this regard, studies have shown that man's short-term memory is very fragile. In as few as nine seconds after a simple concept, such as a few words, has been presented, studies show that short-term memory becomes inaccurate in recalling the simple concept. After 30 seconds, short-term memory becomes very fragile. Even the slightest amount of interference after 30 seconds can destroy whatever thought is being held in short-term memory. Thus, any ideas the non-active user has for editing the file may easily be lost forever.

Low data transmission speeds also contribute to the limitations of the available software packages. Most modems in use with personal computers today operate at 300, 1200 or 2400 bits per second (bps) and are fully compatible. Faster modems, which operate at 4800, 9600 and 19,200 bps, are also available. However, these modems are less common and much more expensive. Also, as the Consultative Committee on International Telegraph and Telephone (CCITT) has yet to establish standards for all these speeds, the faster modems of the same speed are not all compatible. Further, sophisticated error correction and full duplex transmission are not available in some faster modems, and in some of the modems in which error correction is available, four-wire leased telephone lines are required, rather than the standard and much less expensive two-wire dial-up telephone lines.

Due to the low transmission speed, the available software packages for transferring text and graphics have very limited graphics and color capabilities. Graphics and color are data intensive. Sending graphics and/or color data over a 2400 bps modem takes a relatively large amount of time. However, graphics and color are important in newsletters and the like. They are powerful tools for attracting attention, assigning priority, coding information, adding redundancy, etc. If the non-active user is not able to see the graphics being provided and/or the colors being used, the non-active user is constrained as to the type of interaction that can take place.

Dedicated local area networks are now becoming available. These provide faster transmission speeds. However, these require dedicated lines, serve limited areas, and generally do not provide the flexibility and cost-effectiveness required by small publishers and their customers.

From the above, a cost-effective system which allows one or more remote users to see the newsletter on their own personal computers as it is intended to be published, to see changes almost in real time as they are being made, and to contemporaneously and interactively make changes as they see fit is clearly needed for effective editing of newsletters and the like.

SUMMARY OF THE INVENTION

Accordingly, an object of the present invention is to provide an interactive editing system for a plurality of remotely located personal computers which allows substantially simultaneous real time editing of a document being edited by any of the personal computers at virtually any time.

Another object of the present invention is to provide a desktop publishing system for remote personal computers which permits changes to a file being edited to be seen by all users nearly immediately.

A further object of the present invention is to provide a low cost system which permits users of a plurality of personal computers to be able to edit and/or view editing of a single file resident in one of the personal computers in real time.

Yet another object of the present invention is to provide a flexible system by which a single file may be simultaneously accessed by a plurality of remotely located personal computers.

Still another object of the present invention is to provide an inexpensive real time interactive editing system for personal computers which allows interaction between remote users without loss of perception or new ideas due to slow transmission speeds and/or lack of immediate access to a file.

An additional object of the present invention is to provide a cost effective means for remote parties to effectively and quickly edit a document.

To achieve the foregoing objects and in accordance with the purpose of the invention, as embodied and broadly described herein, an interactive editing system for a plurality of users at respective remote locations for permitting any of the users to edit a file to be edited, comprises: a plurality of personal computers, one for each of the users, at least one of the personal computers using multi-tasking processing means, the personal computer using the multi-taking processing means coordinating editing by the users through their respective personal computers of the file to be edited; and interconnecting means for interconnecting the personal computers.

Preferably, the interactive editing system further comprises a plurality of voice communication means, one associated with each of the personal computers, for enabling voice communication between the users. The interconnecting means is preferably a non-dedicated digital communications system, and the personal computers communicate digitally over the non-dedicated digital communications system. The non-dedicated digital network can link both the personal computers and the voice communication means.

Alternatively, the interconnecting means may comprise a plurality of modems, one associated with each of the personal computers, and an analog communications link. In this case, each of the personal computers would preferably include data compression/decompression means so that data to be communicated between the personal computers is compressed before being sent over the analog communications link and decompressed when received from the analog communications link.

Additionally, the present invention provides for a system for substantially simultaneously editing a file by any of a plurality of users, comprising: a plurality of personal computers, one for each of the users, each of the personal computers including means for inputting and means for displaying; and interconnecting means for interconnecting the personal computers, wherein the personal computers include means for coordinating input to any of the input means so that the file can be substantially simultaneously edited from any of the personal computers.

Preferably, the coordinating means is linked to the input means and display means of each of the personal computers utilizing the interconnecting means, and the coordinating means sequentially polls the input from each of the input means, performs any requested operation on the file, and sends data indicative of the requested operation to all of the display means as the operation is carried out. The system may also comprise a plurality of voice communications means, one associated with each of the personal computers, for enabling voice communication between the users. The interconnecting means can be a non-dedicated digital communications system, so that the personal computers communicate digitally over the non-dedicated digital communications system. Similarly, when the interconnecting means is a non-dedicated digital network, the non-dedicated digital network can link both the personal computers and the voice communication means.

Alternatively, the interconnecting means may comprise means for converting digital signals to analog signals and analog signals to digital signals associated with each of the personal computers, and an analog communications link for connecting the converting means, wherein each of the personal computers includes data compression/decompression means so that data to be communicated between the personal computers is compressed before being sent over the analog communications link and decompressed when received from the analog communications link.

The personal computers can be grouped in a plurality of local area networks, and the interconnecting means may include network bridges and gateways for allowing communication between the personal computers on different ones of the local area networks.

Further, the coordinating means can lock out any of the users so that the input by a locked-out user will not be considered by the coordinating means.

The present invention also provides a method for substantially simultaneously editing a file from any of a plurality of personal computers situated at remote locations, at least one of which uses a multi-tasking operating system, comprising the steps of: interconnecting the personal computers over a communications link; and processing the file under control of the one of the personal computers using the multi-tasking operating system according to instructions input from any of the personal computers.

Preferably, prior to the interconnecting step, voice communications are established between users at each personal computer. Also, the personal computers can be interconnected and the telephone communications established over the same communications link.

Other objects and advantages of the present invention will be set forth in the description and drawings which follow, in which like reference numbers denote like parts, and, in part, will be obvious from the description, or may be learned by practice of the invention.

BRIEF DESCRIPTION OF THE DRAWINGS

FIG. 2 is a detailed schematic view of the linkage of the personal computers illustrated in FIG. 1;

DESCRIPTION OF THE PREFERRED EMBODIMENT

For purposes of illustration and explanation only, three personal computers are illustrated and discussed. The system according to the present invention is designed to function for two or more remotely located personal computers.

Figure 1:
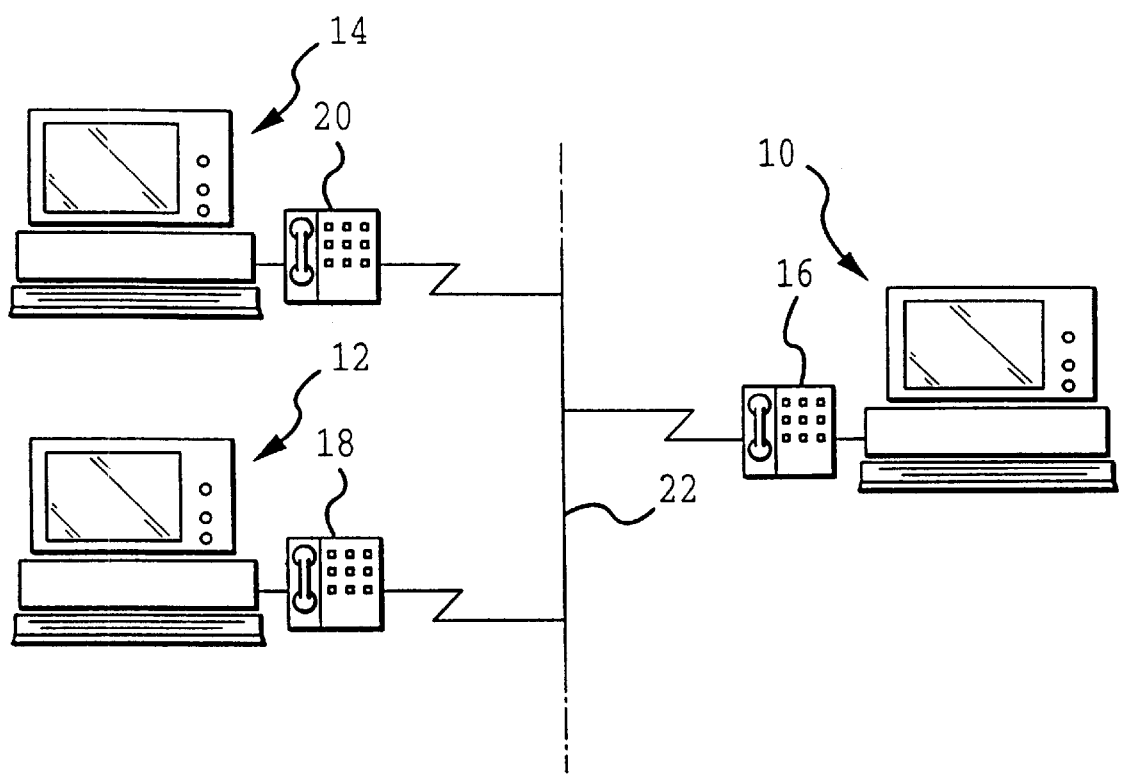
FIG. 1 is a general view of a plurality of personal computers having telephone handsets interconnected over a single digital communication link.

FIG. 1 illustrates three remotely located personal computers (PCs) 10, 12, 14. The PCs 10, 12, 14 can be located in different buildings in the same city, in entirely different cities or different countries. The PCs 10, 12, 14 are linked over a digital communications network 22. Associated with each of the PCs 10, 12, 14 are telephone handsets 16, 18, 20, respectively. The telephone handsets 16, 18, 20 are preferably digital telephones and are connected over the same line of the digital communications network 22 as are the PCs 10, 12, 14.

The PC's 10, 12, 14 can be in any type of configuration, such as in word processing workstations or engineering workstations, and can be independent or associated with different local area networks. If associated with different local area networks, bridges can be used to provide compatibility, if necessary.

Traditionally, a personal computer is defined as a single-user microcomputer designed for personally controllable applications. However, recently introduced single-user computers have many times the processing power of their predecessors, and the term personal computer covers a wide variety of products. Today, single-user personally controllable "desktop" computers are used in technical or engineering workstations for CAD/CAM and the like. Many of these personal computers use reduced instruction set computing (RISC) microprocessors, and can perform functions in a single-user system which were until only recently available just from mainframes. With the introduction of yet more powerful machines, the capabilites of personal computers will continue to evolve and expand.

A single file or document can be composed of words, graphics, other known computer representations or combinations thereof. In order to permit interactive editing of any portion of a file resident in a host PC by users of a plurality of PCs, at least the host PC, designated in FIG. 1 as the PC 10, must have capabilities which are only just now becoming available on the personal computer level. Preferably, the host PC 10 should have relatively fast processing capabilities and have multi-tasking capabilities. Multi-tasking can be implemented through the PC's microprocessor, operating system, the application software, the operating software, or some combination thereof. Past processing speeds and multi-tasking are possible on personal computers which utilize complete instruction set computing (CISC) microprocessors, such as the Intel 80XXX series, including the 80386 and the recently introduced 80486 microprocessors, and also on CISC microprocessors such as the Motorola 86XXX series, including the 86030 and recently introduced 86040 microprocessors. These capabilities are also possible on reduced instruction set computing (RISC) microprocessors, which are produced and/or utilized by such companies as Sun, IBM, Hewlett-Packard and DEC.

For example, Intel's 80XXX microprocessors are being utilized by IBM in its PS/2 series of personal computers. The more advanced of the PS/2 personal computers also utilize IBM's Micro Channel architecture, which speeds up data transfer within the personal computer, and the recently introduced OS/2 operating system, which is a multi-tasking operating system. The heretofore standard operating systems for personal computers, such as MS/DOS and the MacIntosh operating system, are not capable of multi-tasking in and of themselves.

Software is also available that can effectively convert a single-tasking personal computer into a multi-tasking machine. In this way, a single-tasking personal computer is able to run a plurality of different tasks or programs simultaneously. Until recently, however, few presently available personal computers were powerful enough to perform effective multi-tasking through the use of software.

In summary, most presently available personal computers do not have the capabilities necessary for effective multi-tasking. However, availability will become less of a problem as the new faster personal computers presently being developed are introduced to the marketplace. At present, the fastest personal computers operate at only approximately two million instructions per second (MIPS). However, within a relatively short period of time, it is expected that personal computers will be widely available which operate at many times that speed.

As discussed above, the host PC 10 should be a relatively fast personal computer capable of multi-tasking. The remote PCs 12, 14, which can be located in entirely different cities from the host PC 10, are connected to the host PC 10 by the digital communications system 22. The remote PCs 12, 14 do not necessarily have to have all of the capabilities of the host PC 10. In the preferred embodiment, the remote PCs 12, 14 have a master/slave relationship with the host PC 10. More specifically, the peripherals of the remote PCs 12, 14, i.e. the keyboard, the display, and memory, are controlled by and communicate with the microprocessor of the host PC 10. The microprocessors in the remote PCs 12, 14 play supporting roles only.

As discussed above, in order for substantially real time editing of a single document by a plurality of personal computer users to become a reality, speed of communications and cost effectiveness are essential. Until recently, this was not possible. Private digital communications systems have been available for some time. These provide high speed communications, but require dedicated lines. Dedicated lines are generally not available at a cost which is affordable to small businesses and do not provide the flexibility necessary for communicating with customers spread out over the entire country. However, with the arrival of the integrated services digital network (ISDN), readily affordable high speed communications together with the necessary flexibility is becoming a reality. ISDN is a non-dedicated digital communications network which can carry voice and data over the same pair of standard telephone wires. Depending upon the configuration, ISDN can transmit data at speeds up to 64 kilobits per second (kbps), while at the same time permitting simultaneous voice communication over the same line. As ISDN operates on telephone lines already in place, virtually no special equipment is necessary, and thus capital outlay is minimal.

When fully operational nationally, once ISDN is in place for a user, high speed digital communications is possible with any other ISDN subscriber in the country. And when international standards are established and the equipment is in place, international communications between ISDN subscribers will be possible. The only hardware that is necessary to connect a personal computer to an ISDN interface line is an ISDN adapter, such as the ISDN Tel Adapter, which is available from Progressive Computing of Oakbrook, Ill.

In addition, further engineering breakthroughs have been made which will enable even faster digital communications over non-dedicated lines. As these breakthroughs are implemented and become available, they will permit even faster digital communications between remote PCs.

More features of the actual configuration of the system are illustrated in FIG. 2. The remote PCs 12, 14 need not be directly linked to each other over the digital communication network 22, but rather linked directly to the host PC 10 only. The host PC 10 is a personal computer having the capabilities described above. The host PC 10 comprises a CPU 24, usually in the form of a microprocessor, internal memory 26, input/output processor 28, a bus 30 for connecting the CPU 24, internal memory 26 and input/output processor 28, and peripherals 34 which are connected to the input/output processor 28 either by a hardwire connection 32 or some other conventional means, such as infrared transmitters and receivers. The peripherals 34 can include a display 35, a keyboard 36, and auxiliary storage 37, as generally illustrated in FIG. 2.

The remote PCs 12, 14 are also connected to the host PC 10, as is illustrated in FIG. 2. The remote PCs 12, 14 are connected to the input/output processor 28 of the host PC 10 via the digital communications network 22. The CPUs of the remote PCs 12, 14 support the overall operation of the system so that in effect the peripherals of the remote PCs 12, 14 are linked directly to the input/output processor 28 and are under the control of the host PC 10. By establishing such a link, the CPU 24 of the host PC 10 interacts with the peripherals of the remote PCs 12, 14 like it interacts with its own peripherals 34. Data input by a user of the remote PC 12 via its keyboard is input directly to the host PC 10 over the digital communications network 22. The CPU 24 then controls what is to appear on the display of the remote PC 12. Since the transfer of this data is conducted over the digital communications network 22, the likelihood is reduced that user of the remote PC 12 will even notice a time delay that would suggest that an operation has been carried out at the host PC 10 rather than the remote PC 12.

The telephone handsets 16, 18 and 20 associated with each of the PCs 10, 12, 14, respectively, are also linked over the digital communications network 22. As discussed above, it is preferred that the digital communication network 22 be capable of simultaneously handling both voice and data communications. The telephone handsets 16, 18, 20 should be connected over the digital communications network 22 so that each user is able to listen to and speak with all of the other users. Alternatively, if the digital communication network 22 does not have both voice and data capabilities, the telephone handsets 16, 18, 20 can be linked via a traditional conference call over other lines, such as standard analog telephone lines.

The preferred way to initialize the link-up between the PCs 10, 12, 14 is to first establish a conference telephone link between the users using the telephone handsets 16, 18, 20 over the digital communications network 22. Alternatively, a conference call may be established using standard telephone equipment and lines in the conventional way. Then, the PCs 10, 12, 14 are initialized and linked over the digital communications network 22.

In the preferred embodiment, the microprocessors of the remote PCs 12, 14 perform a supporting role only. The keyboard, display and memory of each of the remote PCs 12, 14 act as peripheral devices to the host PC 10.

Figure 3A:
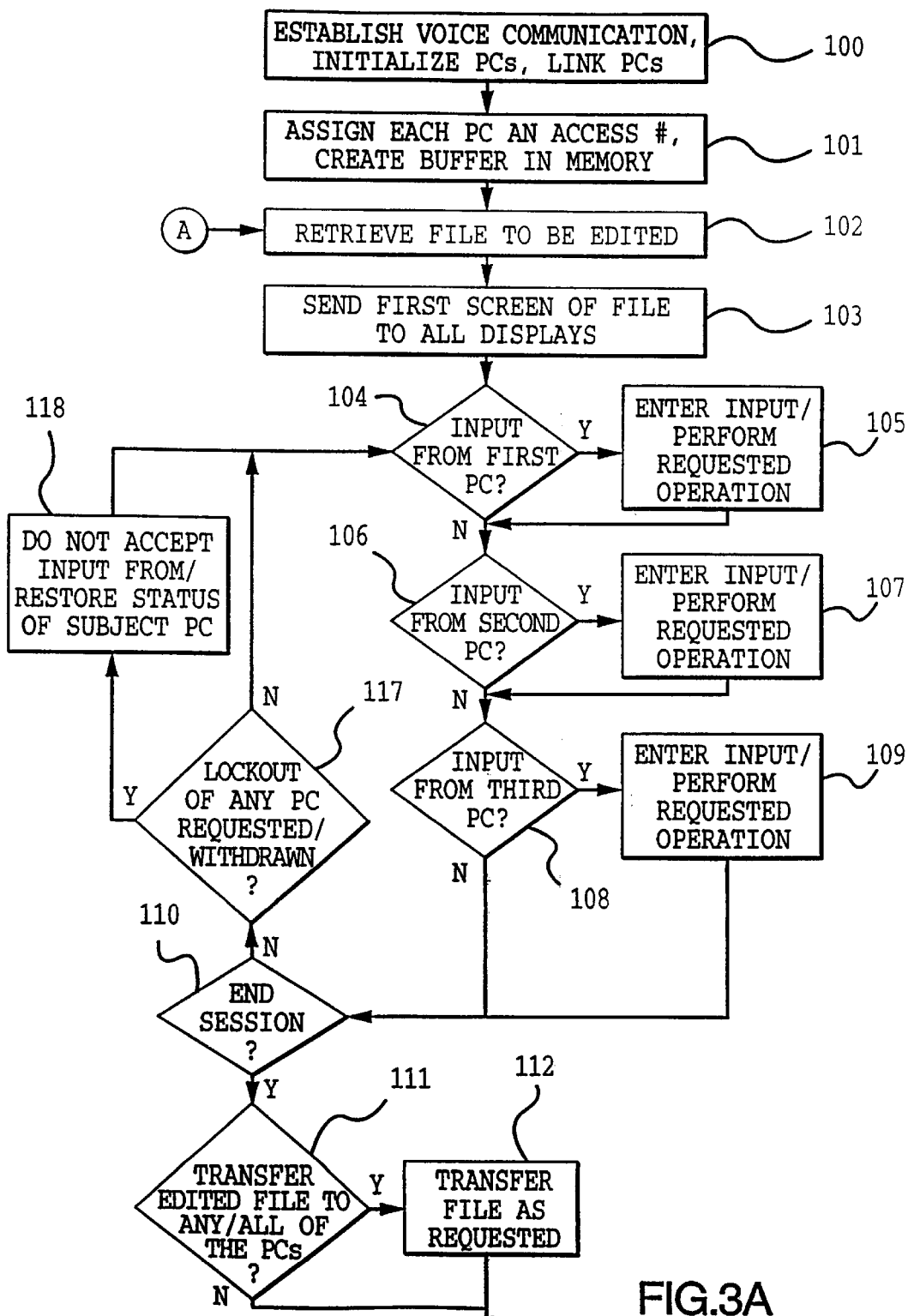
FIGS. 3A–3B show a flow chart of a method for the simultaneous editing of a single document by a plurality of users at respective remote personal computers according to the present invention.
Figure 3B:
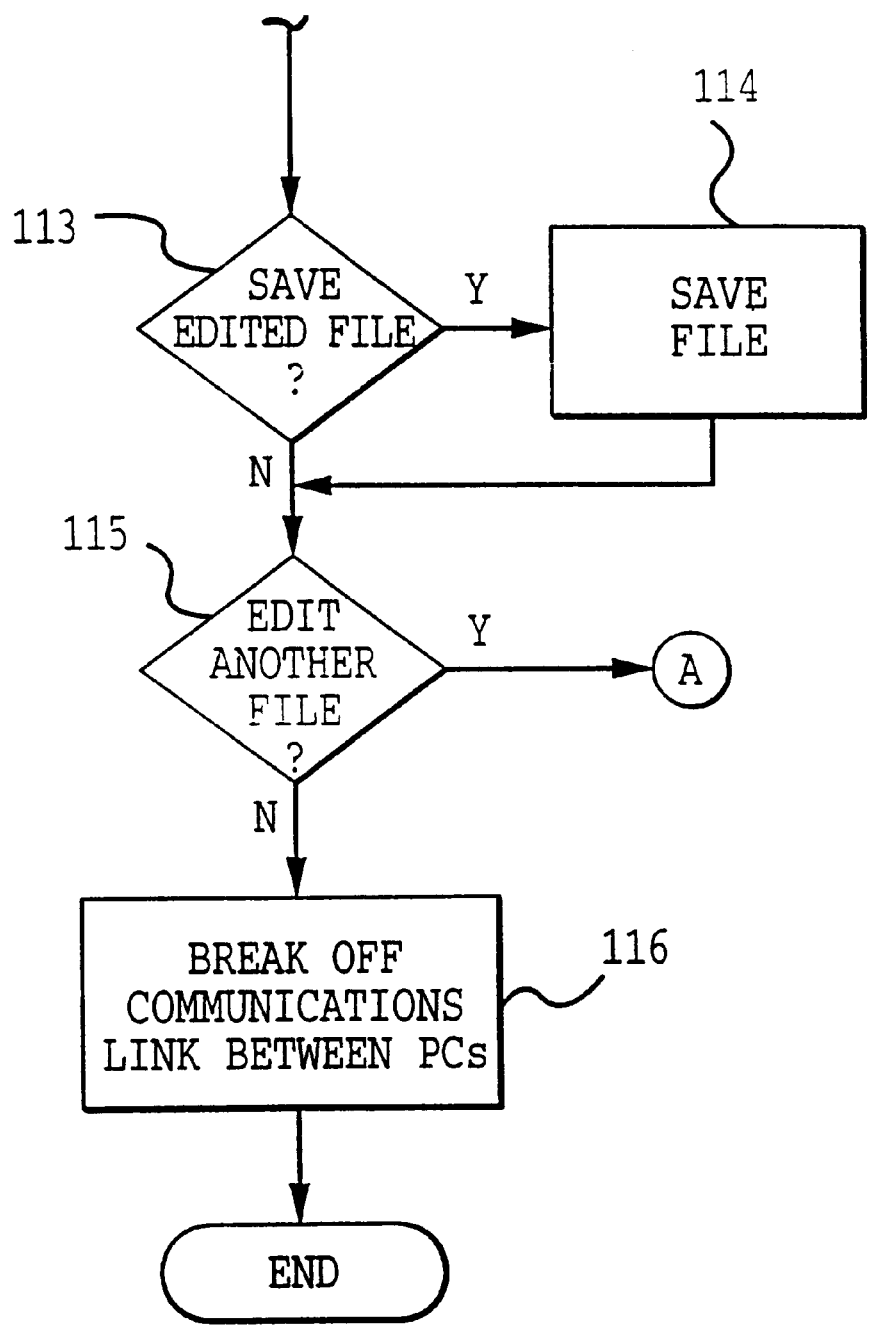

The flow chart of FIG. 3 illustrates the operation of the system as perceived by the host PC 10. In step 100, communication is established between the users, the PCs are initialized, and communication established between the PCs. The host PC then arbitrarily assigns each PC an access or designation number, and creates a buffer in its memory in which incoming data input or function requests may be stacked, if necessary, in step 101. In step 102, the host PC retrieves from any of the PCs the file to be edited, and performs any initial housekeeping procedures that must be carried out before actual editing may begin. At this time, all of the PCs are linked, and all of the users are in voice communication over the telephone handsets provided at each respective PC.

After the host PC retrieves a file for editing from the memory of any of the PCs, the first screen of the file is typically sent to each PC and displayed on the display of each PC (step 103). At this time, editing of the document by any of the users can begin. As illustrated in steps 104–109, the microprocessor of the host PC essentially sequentially polls each of the PCs for input. In the preferred embodiment, in step 104 the microprocessor polls the buffer which holds input for the first PC for input therefrom. The buffer may be checked for a certain period of time, until the buffer is empty, or until it is determined that no input data has been placed in the buffer, i.e. the user of the first PC has not input any data. If there is input, the microprocessor then enters the input and performs the requested function on the file image in memory being edited in step 105, and sends any updates of the file to the displays as they occur. The microprocessor then performs the same function for the other two PCs in steps 106–109. If no changes are requested in the polling sequence or the session is not to be ended, the polling is repeated, starting with step 104.

In general, since the time allotted for polling each PC is extremely small (in the milliseconds), no discernable delay in the processing will be perceived by the users, especially when the number of active users is relatively small. Given that word processing does not normally tax the capability of a typical microprocessor, having three users perform word processing functions on a single advanced microprocessor will not be substantially slower from the viewpoint of even the remote users. The high speed digital communication possible over the digital communications network 22 makes this possible. When editing changes the portion of the file being displayed, the changes are sent to all of the displays simultaneously, and due to the communications speed, a significant delay will not be perceived.

An example of a time that the microprocessor to the host PC may be relatively slow is when a rather complex function is requested, or when a large number of personal computers are active and may engage in editing. Such functions include merging files, moving blocks of data within a file, storing or printing a file, changing the margins or type, performing a spell check operation, etc. When such complex functions are requested, the microprocessor will temporarily stop its polling process, and work on the requested function until the function is completed. This prevents new data from being introduced to the file while the file is being stored, misspelled words from being input while a spell check operation is being performed, a file being changed while the file is being printed, etc. Depending on the function being performed, the microprocessor will either lock out the users from inputting any data or hold input in the buffers.

For the most part, the users will be interacting over the telephone while one user actually performs work on the file. In such cases, the non-active users do not even need to have access to the file. Rather, they can simply simultaneously watch the changes as they are made to the file and communicate their thoughts or ideas with the active user over the telephone hookup.

However, in some cases, different users may actually wish to work on different parts of the file. The use of the host PC may be editing page one of the file, while the user of one of the remote PCs may be editing page three of the file. In this situation, the need for multi-tasking can become important. The relative position of each user in the file must be maintained while different portions of the file are being edited. The microprocessor in this case must send screen updates to each user which are pertinent only to the portion of the file each user is editing. In order to maintain a first user's perception while a second user is changing the file, the first user's display may be only changed to conform to changes entered by the second user only periodically or at the first user's request. The relative position of each user can be maintained by keeping the relative address of each user at the bottom of a stack in the buffer, placed there when the microprocessor finishes polling of that user's PC, and read first when polling of that Pc's buffer begins again.

After each polling sequence, the microprocessor checks to see if a request has been made to end the editing (step 110).

If so, each PC is queried as to whether its user wants the edited file placed in its memory (step 111), and performs whatever transfer is requested (step 112). The host PC is then queried as to whether it wants to save the edited file (step 113), and if so, the file is saved (step 114). In step 115, the host PC is queried as to whether another file is to be edited. If so, that new file is retrieved in accordance with step 102, and interactive multi-user editing of the new file is begun. If not, communication between the PCs is broken off (step 116).

As noted above, the system may become slow when a large number of users have access to the file. In such cases, the polling of all the users would take a relatively large amount of time. However, it is likely that not all of the users would need access to the file. In order to increase the relative speed of the editing, any of the PCs may be locked out and made non-active. If such is requested for a particular PC, that PC's buffer will not be checked for input. The PC will continue to be able to view the editing that is taking place, and its user will be in telephone contact with the other users should he or she have any comments. Conversely, a locked-out PC may be restored to editing status at any time. The lock-out and restoration of status is carried out in steps 117 and 118.

In actual use of the present invention, a newsletter editor in Denver having the host PC would first establish a conference telephone call with customers in Kansas City and San Francisco. All three users would then initialize their respective PCs and establish a link between the PCs over ISDN. The Denver user would then retrieve a file to be edited and perform any housekeeping functions using the host PC. The microprocessor of the host PC would then send the first screen of the file to the display of each PC. It is envisioned that the three users would remain in communication over the telephone link, trading suggestions and comments back and forth, while one of the users actually edits the file, until agreement is reached that the file is in the desired condition. However, any of the users may edit the file at any time, unless that user has been specifically locked out. When the file is in the desired condition, the edited file can be stored by any of the PCs as necessary. The telephone and PC links would then be ended, or work on a new file to be edited begun.

It is also possible to implement the present invention without the polling function and the buffers. In this case, the file would be subject to the input of any user at any time. In such cases, interaction between the users over the telephone is imperative in order to prevent simultaneous input of data, which could result in data collisions and crashing of the system.

Figure 4:
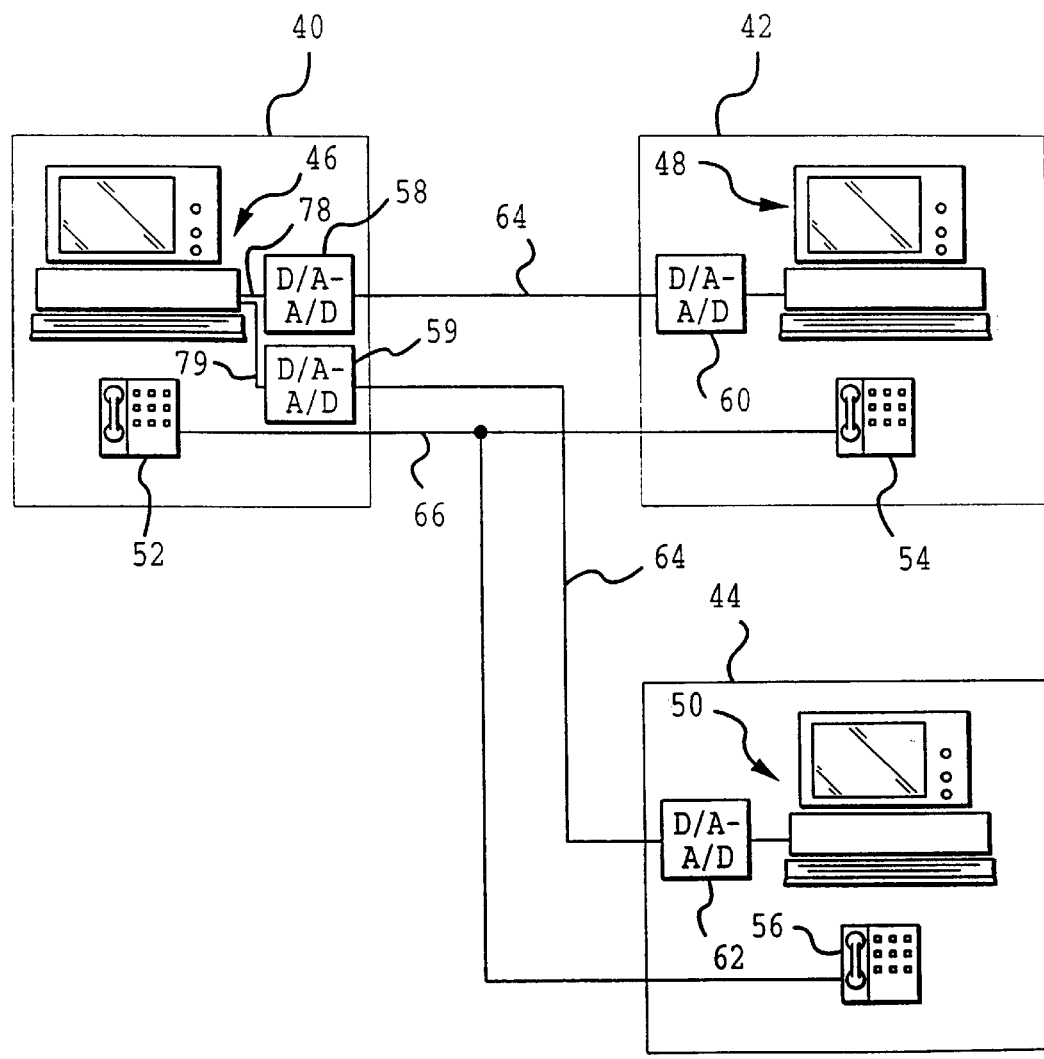
FIG. 4 is a general view of a plurality of workstations which include personal computers and telephone handsets independently interconnected over analog communication lines.

An alternative embodiment is illustrated in FIG. 4. FIG. 4 illustrates three workstations 40, 42, 44 comprising respective PCs 46, 48, 50, and telephone handsets 52, 54, 56. The workstation 40 is arbitrarily designated as the host workstation. The host workstation 40 includes a host PC 46 which has the capabilities discussed above. The host PC 46 is connected to remote PCs 48, 50 at the remote workstations 42, 44 over an analog communications network 64 via digital-to-analog/analog-to-digital converters 58, 59 (one for each remote workstation). Using this equipment, digital signals from the host PC 46 are converted to analog signals (modulated) for transmission over the analog communications network 64, and vice versa. Additionally, each remote workstation 42, 44 has a digital-to-analog/analog-to-digital converter 60, 62, respectively, for communicating with the host PC 46 via the analog communications network 64 and the respective host digital-to-analog/analog-to-digital converters 58, 59.

In order for the present invention to operate using modems and standard telephone communication lines, high-speed modems are necessary. Therefore, the digital-to-analog/analog-to-digital converters should be 9.6 kbps or faster modems which are compatible with each other. However, even at 9.6 kbps, data transfer may not be fast enough such that any change to the file will appear substantially simultaneously to all of the users. Therefore, each of the PCs 46, 48, 50 should use compression utilities and/or each of the modems should have data compression/decompression capabilities. Compression utilities are readily available, and can effectively compress data being sent. Using such compression utilities, 85 percent compression of data is possible. Actual effective throughput of data over the modems can be increased with compression utilities to as much as 100 kbps, rather than the sub-ten kbps without them. Alternatively, modems having inherent data compression/decompression capabilities that effectively increase throughput of data to well beyond 9.6 kbps are now becoming available that can be used for increased data transfer rates. Also, as long as data compression techniques and/or speeds are compatible, a combination of data compression/decompression capable modems and PCs which utilize data compression/decompression utilities can be used in a system.

In any case, in order to make the system fully operational, the digital-to-analog/analog-to-digital converters 58, 59, 60, 62 should be full duplex 9.6 kbps or faster modems. This permits high speed exchange of data back and forth between the remote PCs 48, 50 and the host PC 46.

Further, in the configuration illustrated in FIG. 4, the telephone handsets 52, 54, 56 are connected over a separate analog communication line 66. This is different than the preferred embodiment, in which voice and data communications are over the same line.

Figure 5:
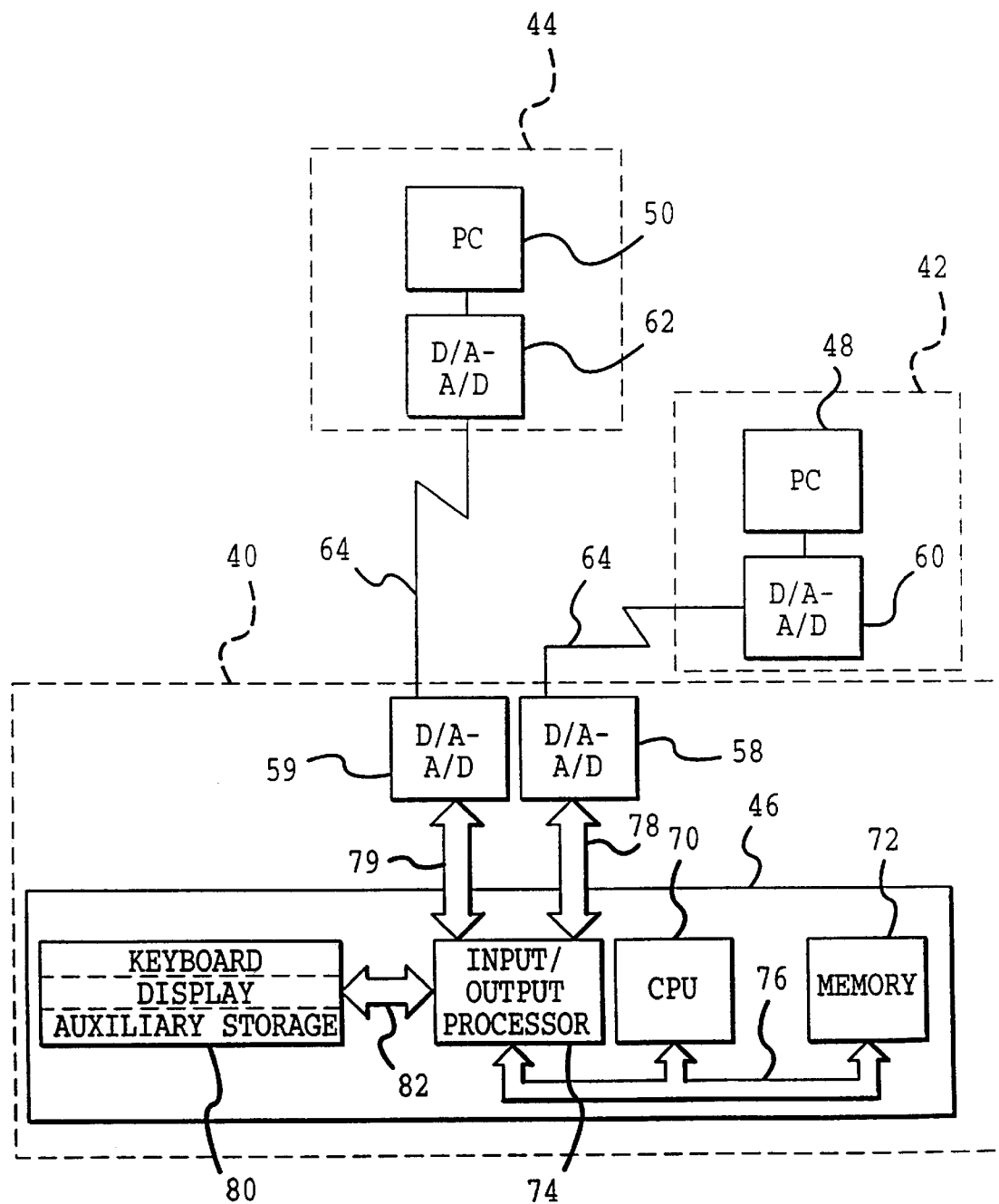
FIG. 5 is a detailed schematic view of the linkage of the personal computers illustrated in FIG. 4.

FIG. 5 illustrates the system configuration for an analog embodiment in which the PCs perform the data compression/decompression function. The host workstation 40 includes a PC 46 which comprises a CPU 70, memory 72, an input/output processor 74, and peripherals 80. The CPU 70, the memory 72, and the input/output processor 74 are interconnected by a bus 76. The input/output processor 74 is linked to the peripherals 80 by a hardwire connection 82. Also included in the workstation 40 are the digital-to-analog/analog-to-digital converters 58, 59, which are linked to the input/output processor 74 by hard wire connections 78, 79 respectively, or other suitable means. The digital-to-analog/analog-to-digital converters 58, 59 connect the workstation 40 to the digital-to-analog/analog-to-digital converters 60, 62 in the respective workstations 42, 44 over the analog communications network 64. The digital-to-analog/analog-to-digital converters 60, 62 are connected to their respective remote PCs 48, 50, each of which have a similar configuration to the host PC 46.

In FIGS. 4 and 5, the two separate lines 78, 79 are illustrated connecting the respective digital-to-analog/analog-to-digital converters 58, 59 to the host PC 46. When a large number of remote PCs are being used, the number of such lines actually being input into the host PC 46 can be reduced by using multiplexers to bring the input from a plurality of such analog lines into one or a few serial lines going into the host PC 46. This would reduce the workload of the host PC 46.

The actual operation of the present invention over an analog communications line is slightly different than the digital operation. The digital-to-analog/analog-to-digital converters 58, 59, 60, 62 and/or the PCs 46, 48, 50 must be capable of independent and compatible compression and decompression of data being sent and received. Further, the remote PCs 48, 50 will play a greater role in the analog system than in the preferred digital embodiment when the digital-to-analog/analog-to-digital converters do not handle data compression/decompression. This situation is illustrated in FIG. 6.

Figure 6:
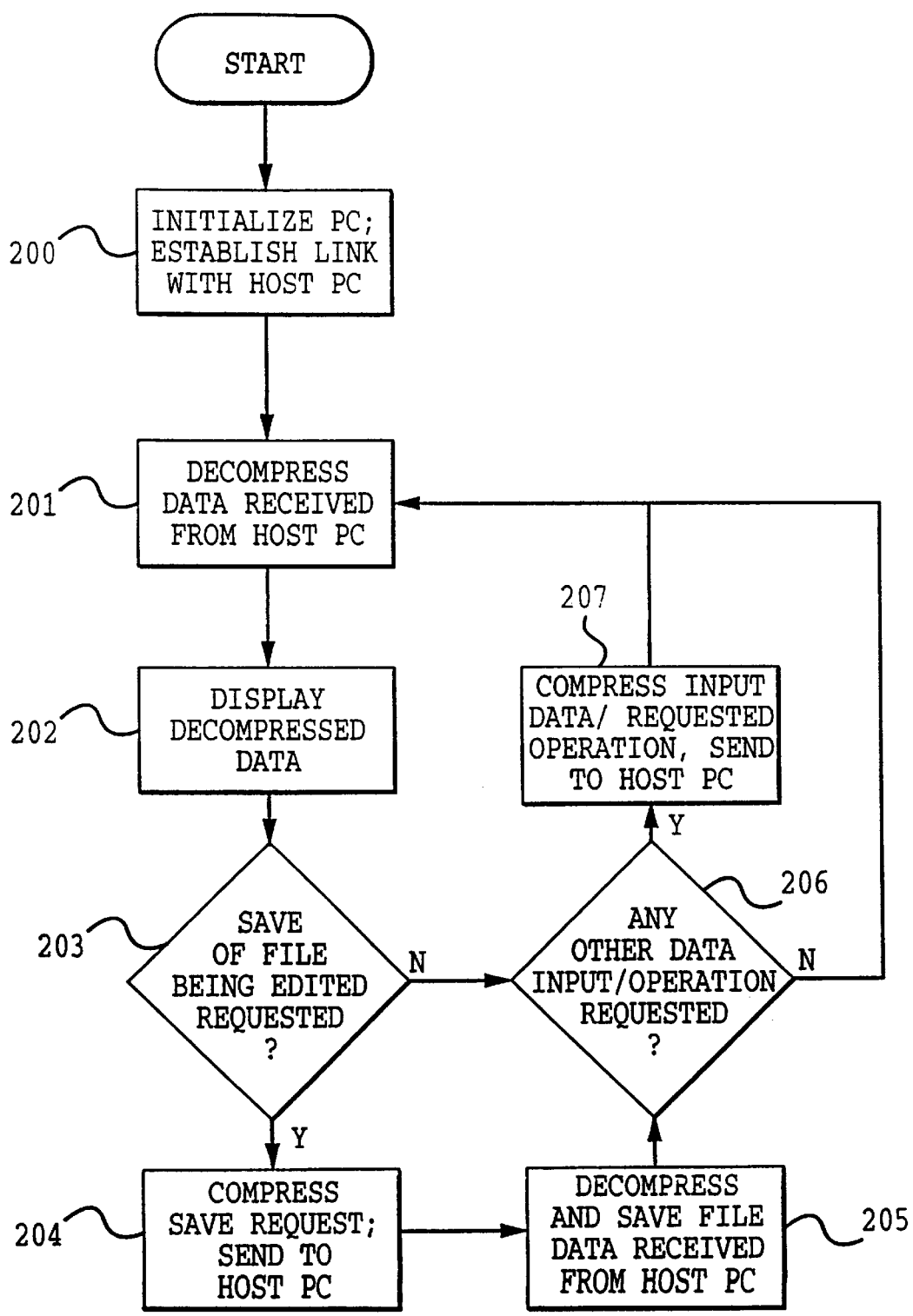
FIG. 6 is a flow chart of a method by which a remote personal computer interacts with a host personal computer to display and edit a file in the host personal computer when the communication link is analog.

FIG. 6 is a flow chart of the operation required from the perspective of each of the remote PCs 48, 56 in this latter case. After the remote PC is initialized, communication is established over the digital-to-analog/analog-to-digital converters with the host PC (step 200). The remote PC then decompresses data received from the host PC (step 201), and displays the decompressed data on its display (step 202). If the remote user requests to save the file (step 203), the remote PC compresses the request and sends it to the host PC (step 204). When the file data is received, the remote PC then decompresses and stores it (step 205). Subsequent to this step or if no save is requested, the remote PC checks for input data or any other operation request from the -remote user (step 206). If any is made, the data or operation request is compressed and forwarded to the host PC. If no such request is made, or after the data is sent, the remote PC decompresses data received from the host PC (step 201), thereby starting the process again.

The function of the host PC in the analog embodiment is similar to that as illustrated in the flow chart in FIG. 3 for the digital embodiment. However, either the host PC or its associated digital-to-analog/analog-to-digital converters should be capable of compressing data prior to sending it to the remote PCs and decompressing data when it is received from the remote PCs.

The present invention may also be carried out using a host PC, as discussed above, and remote computer terminals that do not have the full power of a PC. The remote terminals can be ASCII terminals if transmission of text only will be performed, or bit-mapped image terminals if text and graphics will be transmitted. Such terminals need only have enough local intelligence to enable communications with the host PC. Referring once again to FIGS. 1 and 2, the only difference between this embodiment and the preferred embodiment discussed previously with respect to FIGS. 1 and 2 is that elements 12 and 14 would be ASCII or bit-mapped image terminals rather than full-fledged PCs. Similarly, terminals of this type could be used in place of the PCs 48, 50 in FIGS. 4 and 5 in an analog embodiment. In this case, the digital-to-analog/analog-to-digital converters 60, 62 should be capable of data compression and decompression, as the minimal processing power of the remote terminals would most likely not be able to support this function.

While several embodiments of the invention have been discussed, it will be appreciated by those skilled in the art that various modifications and variations are possible without departing from the spirit and scope of the invention. For example, as the processing power of PCs increases and communications systems improve further, it will be possible to implement the present invention so that processing of a file can be performed substantially contemporaneously by a plurality of the PCs. This would speed up the system and would be particularly effective when a large number of users or time consuming processing is contemplated. No true host PC would be necessary, and each PC may only need to be in direct communication with one or two other PCs, as the system could function serially through a string of PCs or in a closed loop.

What is claimed is:

1. An editing system for presenting edits to a file substantially contemporaneously with an entry thereof to a plurality of users via a plurality of displays, comprising:
 a) a file editing and display subsystem, including:
  1) first processor for accessing a stored file, receiving an editing instruction relative to said stored file, presenting, via a first display system connected to said first processor, a first display including said editing instruction, executing said editing instruction, and providing display information based on said executed editing instruction, wherein said display information includes edits to less than the whole of said file; and
  2) second processor for receiving said display information and using said display information to generate a second display, wherein said first processor and said second processor cooperate such that said second display reflects an editing instruction executed by said first processor and said second display is generated by said second processor substantially contemporaneously with execution of said editing instruction by said first processor;
  3) said first processor being designated as a host node of a network;
  4) said second processor being designated as a remote node separate from said host node; and
 b) network means for interconnecting said host node and said remote node so as to allow for communication therebetween wherein said display information based on said editing instruction is transmitted from said host node to said remote node such that said second display is generated at said remote node based on editing instructions executed on said host node.

2. The editing system as set forth in claim 1, wherein said first processor is operative for receiving said editing instruction from said remote node via said network means.

3. The editing system as set forth in claim 1, wherein said first processor is operative for providing said display information by transmitting said display information to said first display system and to a second display system associated with said second processor at said remote node wherein said display information is made available substantially contemporaneously to said first and second display systems.

4. The editing system as set forth in claim 1, wherein said second processor uses said display information to generate an updated display by updating a first screen display previously communicated by said first processor to said second processor with said display information.

5. An editing method, comprising the steps of:
 first receiving, at a remote node of a network, first display information from a host node of said network corresponding to a file stored on said host node;
 generating a first display on said host node and on said remote node by rendering said received first display information on a first display device associated with said host node and on a second display device associated with said remote node;
 based on review of said first display at said host node, executing an editing instruction provided to said host node, whereby said editing instruction is executed on said host node to generate second display information reflecting edits to less than the whole of said stored file;
 second receiving, at said remote node, said second display information; and
 second generating a second display at said remote node based on said second display information substantially contemporaneously with the providing of said editing instruction to said host node.

6. The editing method as set forth in claim 5, wherein said step of generating a second display at said remote node involves using said first display information to form a first unedited portion of said second display and using said second display information to form a second, edited portion of said second display, wherein said editing instructions executed at said host node are reflected in said second display at said remote node free from execution of said editing instructions at said host node.

7. An editing method, comprising:

accessing, at a host node of a network, a file stored on said host node;

transmitting, from said host node to a remote node, first display information corresponding to said file, wherein said first display information is used at said remote node to generate a first display at said remote node by rendering said first display information on a display device associated with said remote node;

receiving, at said host node, an editing instruction;

executing, at said host node, said editing instruction relative to said file;

generating, at said host node, second display information, wherein said second display information includes edits to less than the whole of said file;

second transmitting, from said host node to said remote, said second display information, whereupon receipt of said second display information, said remote node generates a second display based on said second display information substantially contemporaneously with receipt of said editing instruction at said host node.

8. The editing method as set forth in claim 7, further comprising generating a third display at said host node corresponding to said second display on said remote node, said third display based on information corresponding to said first display information and said second display information, wherein said second and third displays are generated substantially contemporaneously at said host node and remote node.

9. The editing method as set forth in claim 7, further comprising transmitting said second display information to a plurality of remote nodes via a network, wherein said second display information is made available substantially contemporaneously at said plurality of remote nodes.

10. An editing system for presenting edits to a file substantially contemporaneously with an entry thereof to a plurality of users via a plurality of displays, comprising:

a) a file editing and display subsystem, including:
1) first processor for accessing a stored file, receiving an editing instruction relative to said stored file, executing said editing instruction, and providing display information based on said executed editing instruction, wherein said display information includes edits to less than the whole of said file;
2) second processor for receiving said display information and using said display information to generate a display, wherein said first processor and said second processor cooperate such that said display reflects an editing instruction executed by said first processor and said display is generated by said second processor substantially contemporaneously with execution of said editing instruction by said first processor;
3) third processor for receiving said display information and using said display information to generate a second display, wherein said second display is generated by said processor substantially contemporaneously with generation of said display by said second processor;
4) said first processor being a host node of a network;
5) said second processor being a remote node; and
6) said third processor being a second remote node; and b) network means for interconnecting said host node, said remote node and said second remote node so as to allow for communication therebetween, wherein said display information based on said editing instruction is transmitted from said host node to said remote node and said second remote node such that said second display is generated substantially contemporaneously at said second remote node based on editing instructions executed on said host node and displayed at said remote node.

11. A system for communicating information over a network between a plurality of users comprising:

at least one user device, wherein a first user utilizes the at least one user device to input changes to a file, wherein at least one version of the file is accessed by both the first user and a second user;

at least one other user device, utilized by the second user, for receiving the changes to the file; and a communications network connecting the at least one user device and the at least one other user device and facilitating the communication of the changes to the file from the at least one user device to the at least one other user device;

wherein the changes constitute modifications to less than the entirety of the file and the second user may receive the changes substantially contemporaneously with an inputting of the changes to the file by the first user.

12. The system of claim 11, wherein the at least one user device further comprises a personal computer.

13. The system of claim 11, wherein the at least one user device further comprises:

a microprocessor;

internal memory;

input/output processor; and at least one peripheral device.

14. The system of claim 11, wherein the communications network further comprises at least one of an ISDN network and a telephone network.

15. The system of claim 11, wherein the communications network carries a signal in at least one of an analog format and a digital format.

16. The system of claim 11, wherein the communications network carries at least one of a voice signal and a data signal.

17. The system of claim 11, wherein the communications network utilizes a wired medium and at least one other communications medium.

18. The system of claim 11, wherein the file includes at least one of computer aided design information, computer aided manufacturing information, information utilized in a collaborative work environment, textual information, graphical information, audio information and video information.

19. The system of claim 11, wherein the file includes information capable of being communicated to the second user via a local area network.

20. The system of claim 11, wherein the communication of the changes to the file to the second user enables the first user and the second user to maintain their relative positions within the file.

21. The system of claim 11, wherein the communication of the changes to the file to the second user are provided as necessary to maintain a perception of the file for the second user while the first user inputs the changes to the file.

22. The system of claim 11, wherein at least one of the at least one user device and the at least one other user device is connected via a local area network to the communications network.

23. The system of claim 11, wherein the communications network further comprises a server which facilitates the communication of the changes from the at least one user device to the at least one other user device.

24. The system of claim 11, wherein at least one of the first user device and the at least one other user device further comprises a means for coordinating the changes to the file.

25. A communications system for communicating edits of less than the entirety of a file to a plurality of users comprising:

at least one node for receiving, from a first user, an edit to a file, wherein at least one version of the file is contemporaneously accessed by both the first user and a second user;

at least one second node via which the edit is communicated to the second user; and at least one communications network connecting the at least one first node with the at least one second node;

whereupon receipt of the edit at the at least one first node, the edit is communicated from the at least one first node, via the at least one communications network, to the at least one second node, whereupon the second user receives, via the second node, the edit to the file substantially contemporaneously with the entry of the edit by the first user.

26. The communications system of claim 25, wherein at least one of the at least one node and the at least one second node is connected to a personal computer.

27. The communications system of claim 25, wherein at least one of the at least one node and the at least one second node is connected to a local area network.

28. The communications system of claim 25, wherein at least one communications network is capable of communicating the edit in at least one of a digital format and an analog format.

29. The communications system of claim 25, wherein the at least one communications network communicates information in at least one format selected from the group consisting of: an audible format, a visual format, a textual format and a graphics format.

30. The communications system of claim 25, wherein the at least one node is connected to a first user device at which the first user inputs the edit to the file.

31. The communications system of claim 30, wherein the first user device further comprises a device containing a microprocessor, and input/output processor, and an internal memory.

32. A system for communicating information over a network between a plurality of users comprising:

a means for a first user to enter a modification to a file, wherein at least one version of the file is accessible by the first user and at least one second user;

a means for communicating the modification to the at least one second user; and a means for the at least one second user to receive the modification from the means for communicating;

wherein the modification communicated by the means for communicating constitutes less than the entirety of the file such that the at least one second user receives the modification substantially contemporaneously with entry of the modification to the file by the first user.

33. The system of claim 32, wherein the means for a first user to enter a modification to a file further comprises:

a means for inputting the modification to the file;

a means for displaying the modification to the file as it is inputted;

a means for processing the modification to the file; and a second means for communicating, connected to the means for communicating, the modification to the file;

wherein the modification to the file is communicated to the means for the at least one second user to receive the modification upon the entry of the modification to the file, the modification to the file constituting edits to less than the entirety of the file.

34. The system of claim 32, wherein the means for communicating further comprises at least one of an analog network and a digital network.

35. A method for distributing information to a plurality of users, wherein the information constitutes at least one modification to a version of a file being reviewed by each of the plurality of users, such that each user can substantially contemporaneously review the information, comprising:

receiving the information at a node for transmission to at least one of a plurality of users;

identifying at least one destination, wherein the at least one destination is associated with at least one of the plurality of users;

establishing a communications link between the node and the at least one destination; and transmitting the information from the node to the at least one destination;

whereupon reception of the information at the node, the information is transmitted to the at least one destination such that each of the plurality of users receives the information substantially contemporaneously with the entry thereof by a user reviewing the file.

* * * * *

(12) EX PARTE REEXAMINATION CERTIFICATE (5869th)
United States Patent
Klug

(10) Number: US 6,411,965 C1
(45) Certificate Issued: *Aug. 21, 2007

(54) REMOTE MULTI-USER EDITING SYSTEM AND METHOD TRANSMITTING EDIT DISPLAY INFORMATION

(75) Inventor: John R. Klug, Denver, CO (US)

(73) Assignee: Edisync Systems LLC, Lakewood, CO (US)

Reexamination Request:
No. 90/006,941, Feb. 17, 2004

Reexamination Certificate for:
Patent No.: 6,411,965
Issued: Jun. 25, 2002
Appl. No.: 09/139,194
Filed: Aug. 25, 1998

(*) Notice: This patent is subject to a terminal disclaimer.

Related U.S. Application Data

(63) Continuation of application No. 07/975,905, filed on Nov. 12, 1992, now Pat. No. 5,799,320, which is a continuation of application No. 07/397,996, filed on Aug. 23, 1989, now abandoned.

(51) Int. Cl.
*G06Q 10/00* (2006.01)
*G06F 17/24* (2006.01)
*G11B 27/031* (2006.01)

(52) U.S. Cl. .................. 707/201; 709/204; 715/540
(58) Field of Classification Search ........................ None
See application file for complete search history.

(56) References Cited

U.S. PATENT DOCUMENTS

| | | | |
|---|---|---|---|
| 3,534,338 A | 10/1970 | Christensen et al. | 340/172.5 |
| 4,405,829 A | 9/1983 | Rivest et al. | 178/22.1 |
| 4,572,509 A | 2/1986 | Sitrick | 273/85 G |
| 4,633,430 A | 12/1986 | Cooper | 707/500 |
| 4,641,274 A | 2/1987 | Swank | 707/531 |
| 4,787,032 A | * 11/1988 | Culley | 710/240 |
| 4,862,167 A | 8/1989 | Copeland, III | 341/107 |
| 4,901,223 A | 2/1990 | Rhyne | 710/73 |
| 4,907,146 A | 3/1990 | Caporali | 364/132 |
| 4,924,434 A | 5/1990 | Christenson et al. | 710/6 |
| 4,953,159 A | 8/1990 | Hayden et al. | 370/62 |
| 5,008,853 A | * 4/1991 | Bly et al. | 345/751 |
| 5,014,267 A | 5/1991 | Tompkins et al. | 370/259 |
| 5,016,009 A | 5/1991 | Whiting et al. | 341/67 |
| 5,173,854 A | 12/1992 | Kaufman et al. | 370/259 |
| 5,206,934 A | 4/1993 | Naef, III | 395/200.34 |
| 5,280,583 A | 1/1994 | Nakayama et al. | 395/200.35 |
| 5,300,943 A | 4/1994 | Jakobs et al. | 345/1 |

FOREIGN PATENT DOCUMENTS

EP 0 262 991 A2 4/1988

OTHER PUBLICATIONS

Intel Processor Summary, Brief Processor Feature Description, Dec. 3, 1986, 3 pages.*

"IBM OS/2 Segment Register Map Display Tool", IBM Technical disclosure Bulletin, Dec. 1988, vol. 31, issue No. 7, pp. 341–342.*

S.Greenberg "Sharing views and interactions with single–user applications" ACM SIGOIS, vol. 11, issue 2–3, Apr. 1990, pp. 227–23.*

Giovanna Ferrari, NOKIA research center, "A Survey of Collaborative Systems" Apr. 2001, 14 pages.*

(Continued)

*Primary Examiner*—Charles Craver

(57) ABSTRACT

The user of any of a plurality of personal computers linked over an analog or digital network is able to edit a file in one of the personal computers. This one personal computer is a personal computer capable of multi-tasking which effectively permits multi-user access to the file. The host personal computer effectively performs polling of the remote personal computers for input to be added to the file or functions to be performed on the file. In the analog configuration, the personal computers use high-speed modems and data compression/decompression techniques.

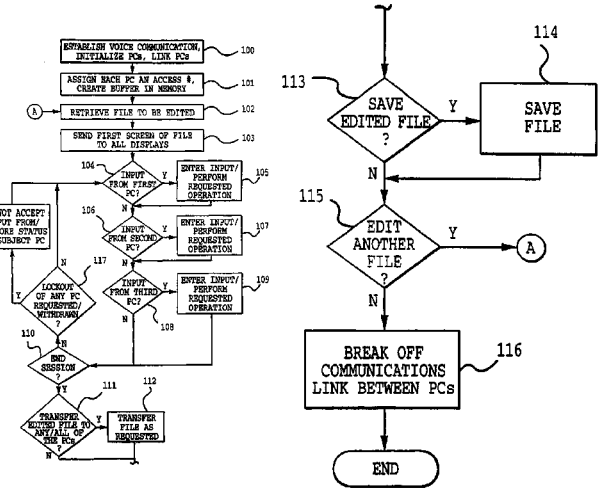

OTHER PUBLICATIONS

Atual Prakash, "Group Editors", Computer supported coopdrative work, 1999 John Wiley & Sons ltd, chapter 5, pp. 103–104.*

Mark Roseman et al. "Building real time groupware with GroupKit, A groupware toolKit", Jul. 1995, pp. 1–30.*

Shiro Sakata et al. "Real–Time desktop conference system based on integrated group communication protocols", Computers and communications 1988, confernece proceedings, seventh annual international phoenix conference: Mar. 1988, pp. 379–38*

Edward M Dunlap et al. "Personal computer communications via telephone facilities", IEEE journal of selected area in communications, vol. SAC–3, May 1985, pp. 399–407.*

Xerox Star, 3 pages, publishing date not available.*

Xerox 6085, old–computers.com 2 pages, publishing date not available.*

Xerox 6085 professional computer system 3 pages, publishing date not available.*

Sunil Sarin et al, title: "Computer–based Real–Time Conferencing System" Part II: New Technologies for CSCW, item 15 pp. 397–420 Computer supported cooperative work: A book of reading edited by Irene Greif, published on May 1, 1988.*

Sunil Sarin et al., title: "Computer–based Real–Time Conferencing System" PartII: New Technologies for CSCW, item 15 pp. 397–420 Computer supported cooperative work: A book of reading edited by Irene Greif, published on May 1, 1988 C.*

Turley, J.L., "PCs Made Easy", Osborn McGraw–Hill, p. 111–122, 1989.

DeBoever, L.R., "Is OS–2 LAN Manager as MS–DOS is to UNIX?", Software Magazine, vol. 9, No. 5, p. 80(3), Apr. 1989.

Rosenberg, Ph.D., "Dictionary of Computers, Information Processing, and Telecommunications", 2nd Edition, John Wiley & Sons, Inc., pp. 462 and 704, 1987.

Centra's Motion for Summary Judgment Dismissing the Action, 3 pages, filed Sep. 22, 2005.

Memorandum in Support of Centra's Motion for Summary Judgment Dismissing the Action, 8 pages, filed Sep. 22, 2005.

Untied States Court of Appeals, Federal Circuit, *Harold G. Abbey, Plaintiff–Appellant, v. Robert Bosch GMBH, Mercedes–Benz of North America, Inc., L.P. Evans Motors or West Palm Beach, Inc., Bill Ussery Motors, Inc., and Mercedes–Benz A.G., Defendants–Appellees,* No. 99–1169, Oct. 6, 1999, Thompson/Westlaw, 3 pages, filed Sep. 22, 2005.

Untied States Court of Appeals, Federal Circuit, *Neupak, Inc., Plaintiff–Appellant, v. Ideal Manufacturing and Sales Corp., Defendants–Appellees,* No. 01–1368, 01–1389, Jul. 24, 2002, Thompson/Westlaw, 7 pages, filed Sep. 22, 2005.

Exhibit 1 attached to Centra's Motion for Summary Judgment Dismissing the Action, 11 pages, filed Sep. 22, 2005.

Exhibit 2 attached to Centra's Motion for Summary Judgment Dismissing the Action, 11 pages, filed Sep. 22, 2005.

Exhibit 3 attached to Centra's Motion for Summary Judgment Dismissing the Action, 5 pages, filed Sep. 22, 2005.

Edisync's Response to Defendant Centra's Motion for Summary Judgment, filed Oct. 21, 2005.

Reply Memorandum in Support of Centra's Motion for Summary Judgement Dismissing the Action, 8 pages, filed Nov. 7, 2005.

Amendment and Response to Office Action of Oct. 4, 2004, U.S. Appl. No. 10/022,557, Mar. 29, 2005.

Amendment and Response to Office Action of Oct. 1, 2004, U.S. Appl. No. 10/021,999, Mar. 29, 2005.

Office Action, U.S. Appl. No. 10/021,999, May 19, 2005.

Office Action, U.S. Appl. No. 10/022,557, May 19, 2005.

Supplemental Amendment to Claims, Reexamination U.S. Appl. No. 90/006,940 (Patent No. 5,799,320), Jun. 2, 2005.

Notice of Non–Compliant Amendment (for Patent No. 5,799,320), Jan. 11, 2005.

Response to Notice of Non–Compliant Amendment (for Patent No. 5,799,320), Feb. 10, 2005.

Status of Claims and Support for Claim Changes Under 37 C.F.R. 1.530(e) (for Patent No. 5,799,320), Feb. 10, 2005.

Supplemental Response (for Patent No. 5,799,320), Mar. 15, 2005.

Second Declaration by Gary J. Nutt Under 37 C.F.R. 1.132 (for Pat. No. 5,799,320), Mar. 15, 2005.

Office Action, U.S. Appl. No. 10/021,999, Oct. 1, 2004.

Office Action, U.S. Appl. No. 10/022,557, Oct. 4, 2004.

Office Action in Ex Parte Reexamination (for Patent No. 5,799,320), Oct. 27, 2004.

Ex Parte Reexamination Interview Summary (for Patent No. 5,799,320), Dec. 15, 2004.

Response to Office Action Under 37 C.F.R. 1.550(b) (for Patent No. 5,799,320), Dec. 22, 2004.

Amendment to Claims Under 37 C.F.R. 1.530(d)(2) (for Patent No. 5,799,320), Dec. 22, 2004.

Status of Claims and Support for Claim Changes Under 37 C.F.R. 1.530(e) (for Patent No. 5,799,320), Dec. 22, 2004.

Interview Written Statement per 37 C.F.R. 1.560(b) (for Patent No. 5,799,320), Dec. 22, 2004.

*Akzo N.V. v. U.S. Int'l Trade Comm'n,* 808 F.2d 1471, 1 USPQ2d 1241 (Fed. Cir. 1986), cert. denied, 482 U.S. 909 (1987), 1–20 pages only.

*Computerworld,* Nov. 1, 1982, p. 46.

*C.R. Bard, Inc. v. M3 Systems, Inc.* 157 F.3d 1340, 48 USPQ2d 1225 (Fed. Cir. 1998), rehearing denied & suggestion for rehearing in banc declined, 161 F.3d 1380 (Fed. Cir. 1998), 1–44 pages.

*Dictionary of Computers,* pp. 255, 462, 555, and 642, 1987 Second Edition.

*Dictionary of Computers, Information Processing & Telecommunications,* 1987, p. 704.

*Eli Lilly & Co. v. Board of Regents of University of Washington,* 334 F.3d 1264, 1270 (Fed. Cir. 2003), pp. 1–10.

*Engineering News–Record,* McGraw–Hill, Inc., Nov. 4, 1982, p. 13.

Hofte, Henri Ter, "Working Apart Together", *Telematica Institut Fundamental Research Series,* Enschede, The Netherlands, 1998, pp. 1–279.

*Microsoft Press Computer Dictionary,* 4$^{th}$ Edition, pp. 239–240, 339, 340, 343–344, 363, and 369.

*Rowe v. Dror,* 112 F.3d 473, 42 USPQ2d 1550 (Fed. Cir. 1997), 1–9 pages.

*Trintec Industries, Inc. v. Top–U.S.A. Corp.,* 295 F.3d 1292, 63, USPQ2d 1597 (Fed. Cir. 2002), 6 pages.

CSE 531 Online, Assignment Solutions, at http://cactuseas.asued/partha/Teaching/591–DOS–SEC–2004–03/HW1–soln.htm, 2004, 4 pages.

H. Kakugawa, Chapter 1 Introduction: Distributed Systems Asynchronous Systems, 2003 at http://kakugawa.aial.Hiroshima–u.ac.up/lecture/2003/as/chap1.ps, 5 pages.

Workstation, at http://iroi.seu.edu.cn/books/ee_dic/whatis/workstat.htm, Nov. 24, 1999.

"Chronology of Workstation Computers," Ken Polsson 2001–2003, at http://wwww.islandnet.com/-kpolsson/worstat/, 4 pages.

*Webster's NewWorld Dictionary,* pp. 254 and 378, Third Edition.

*Webster's NewWorld Dictionary of Computer Terms,* Third Edition, 1987, pp. 102, 279, 346, 409.

*Intergraph Corp. v. Intel Corp.,* 3 F.Supp.2d 1255 (N.D. Ala., 1998), 1–41 pages.

*IEEE Standard Dictionary of Electrical and Electronic Terms,* Sixth Edition, IEEE Std 100–1996, pp. 276, 491, 572, 688–689, 763, 1209.

*Newton's Telecom Dictionary,* 18$^{th}$ Edition, 2002, pp. 564, 833.

*Modern Dictionary of Electronics,* 6$^{th}$ Edition, 1984, p. 727.

*Computer Desktop Encyclopedia,* 9$^{th}$ Edition, 2001, pp. 674, 751–752.

*Controlling the Flow, Internet Computing,* at http://computer.org/internet/, May/Jun. 2000, p. 36.

*Lemelson–MIT Program, Inventor of the Week,* at http://web.mit.edu/invent/iow/grief.html, 2004.

*Microsoft Corp. v. Multi–Tech Systems, Inc.,* 2002 WL 1949755, *3 (not reported in F.Supp.2d) (D. Minn, 2002), 1–27 pages.

*Alza Corp. v. Mylan Laboratories, Inc.*.310 F.Supp.2d 610, 631 (D. Vt. 2004), 1–25 pages.

*Digital Equipment Corporation,* at http://www.wordiq.com/definition/Digital Equipment Corporation, Aug. 10, 2004, 2 pages.

PARC History, at http:///www.par.com/about/history/default.html, Aug. 10, 2004, 6 pages.

Ex Parte John R. Klug, Appeal No. 95–4544, 1995 WL 1747726 (Bd. Pat. App & Interf.).

Johnson et al., "*The Xerox Star: A Retrospective*", IEEE, Sep. 1989.

Office Action in Ex Parte Reexamination (for Patent No. 5,799,320), Jun. 21, 2004.

Ex Parte Reexamination Interview Summary (for Patent No. 5,799,320), Aug. 18, 2004.

Declaration of Gary J. Nutt Under 37 C.F.R. 1.132 (for Patent No. 5,799,320), Aug. 23, 2004.

Response to Office Action Under 37 C.F.R. 1.550(b) (for Patent No. 5,799,320), Aug. 23, 2004.

Interview Written Statement per 37 C.F.R. 1.560(b) (for Patent No. 5,799,320), Aug. 23, 2004.

Status of Claims and Support for Claim Changes Under 37 C.F.R. 1.530(e) (for Patent No. 5,799,320), Aug. 23, 2004.

Amendment to Claims Under 37 C.F.R. 1.530(d)(2) (for Patent No. 5,799,320), Aug. 23, 2004.

Information Disclosure Statement Under 37 C.F.R. 1.555 (for Patent No. 5,799,320), Aug. 23, 2004.

"114)! How can I 'tee' an X program identically to several displays?," [retrieved Jun. 12, 2002] <URL:http://www.faqs.org/faqs/x-faq/part6/section-4.html>.

"The BBN Slate Document Communications System." BBN Software Products Corporation. advertising brocure, 1989.

"The BBN Slate Document Communications System." System and Technologies Corporation, 1988.

"Computer–Supported Cooperative Work: A Book of Readings," edited by Irene Greif, Morgan Kaufmann Publishers, 1988.

"Douglas Carl Engelbart—About BA Doug Engelbart Colloquium OHS Friends Resources Forums," Bootstrap Alliance, http://www.bootsrap.org/engelbart/index.jsp, Oct. 2, 2002, 6 pages.

"Economy Packs for PhoneNET Timbuktu," *MacWeek Work Station News,* vol. 3, No. 2, Jan. 10, 1989, pp. 24–25.

"Editorial: Introduction to the Special Issue," ACM Transactions on Office Information Systems, vol. 6, No. 4, Oct. 1988.

Timbuktu/Remote User's Guide, Farallon Computing, Inc., Berkeley, CA, 1988, publication date unknown, pp. 6–8.

Timbuktu and Timbuktu/Remote systems, namely E. Brower, "Apple Looks Down the ISDN Channel," *MacWeek,* vol. 3, No. 13, Mar. 28, 1989, p. 10.

AT&T Virtual Network Computing: VNC How It Works, VNC Frequently Asked Questions (FAQ), Department of Engineering, University of Cambridge (date unknown).

Ahuja, S. R. et al., "The Rapport Multimedia Conferencing System," Conference on Office Systems (Mar. 23–25, 1988) Palo Alto, California, pp. 1–8.

Akscyn, Robert M. et al., "KMS: A Distributed Hypermedia System for Managing Knowledge in Organizations," vol. 31, No. 7, Jul. 1998, pp. 820–835.

Bair, James H., "Supporting Cooperative Work with Computers: Addressing Meeting Mania," Com.con '89, Thirty–Fourth IEEE Computer Society International Conference, Feb. 27–Mar. 3, 1989, pp. 208–209, 212–217.

Bazik, John, "xmx /–an X protocol multiplexor," .TH XMX Local (Aug. 29, 1990).

Bazik, John "XMX Version 1," 1990 [online], [retrieved on Jun. 11, 2002]. Retrieved from the Internet <URL:http://www.cs.brown.edu/software/xmx/vl.html>.

Bazik, John, "XMX An X Protocol Multiplexor Version 1.1," Department of Computer Science, Brown University, Providence, Rhode Island, Copyright 1988, 1989, and 1990.

Bazik, John, "Sharing X Applications with XMX—A Quick Tutorial," Oct. 7, 1999 [online], [retrieved on Jun. 10, 2002]. Retrieved from <URL:http://www.cs.brown.edu/software/xmx/ tutorial>.

Begole, James et al., "Collaboration Transparency in Java Through Event Broadcasting," Department of Computer Science, Virginia Tech, Blacksburg, VA (date unknown).

Brewer, Danny et al., "Farallon Timbuktu/Remote User's Guide," Farallon Computing, Inc., Berkeley, California, I, (1988).

Buerger, D., "Buyers must bone up on complexities of 9600–bps modem technology" *Infoworld,* Dec. 7, 1987, p. 18.

Burbeck, Ph.D , Steve, "Applications Programming in Smalltalk–80$^2$: How to Use Model–View–Controller (MVC)" (1987, 1992).

Caine, S., "HST modem keeps users in the fast lane", *Digital Review,* Dec. 16, 1987, p. 12.

Chamberlin, Donald Et al., "Quill: An Extensible System for Editing Documents of Mixed Type," 1988, vol. II, Software Track, Proceedings of the Twenty–First Annual Hawaii International Conference. pp. 317–326.

Conklin, Jeff, "Hypertext: An Introduction and Survey," *COMPUTER,* Sep. 1987, pp. 17–41.

Coombs, James H. et al., "Markup Systems and the Future of Scholarly Testing Processing," vol. 30, No. 11 (Nov. 1987) pp. 933–947.

Engel, Klaus et al., A Framework for Interactive Hardware Accelerated Remote 3D–Visualization, University of Stuttgart, IfI, Visualization and Interactive Systems Group (date unknown).

Engelbart, Douglas C., "A Research Center for Augmenting Human Intellect," obtained at the AFIPS Conference Proceedings, vol.33, Part One—1968 Fall Joint Computer Conference, (Dec. 9–11, 1968) San Francisco, CA; American Federation of Information Processing Societies, New York, NY, 1968; Library of Congress Catalog Car No. 55–44701, Thompson Book Company, Washington, D.C., pp. 395–410.

Engelbart, Douglas C. et al., "Toward High–Performance Knowledge Workers," obtained at the AFIPS 1982 Office Conference Automation Conference, Apr. 5–7, 1982, San Francisco, CA; sponsored by the American Federation of Information Processing Societies, Inc., 1982; Library of Congress Catalog Card No. 80–648747, pp. 279–290.

Engelbart, Douglas et al., "Working Together," *BYTE*, McGraw Hill Publication, Dec. 1988, pp. 245–252.

Engelbart, Douglas C., "Intellectual Implications of Multi–Access Computer Networks," Stanford Research Institute, 1970, (AUGMENT.5255), Bootstrap Institute—http://www.bootstrap.org/augment/AUGMENT/5255.html, Aug. 19, 2002, 9 pages.

Engelbart, Douglas C., "NLS Teleconferencing Features: The Journal and Shared–Screen Telephoning," Augmentation Research Center Stanford Research Institute, Jul. 29, 1975, Bootstrap Institute—http://www.bootstrap.org/augment/AUGMENT/33076.html, Sep. 18, 2002, 7 pages.

Epard, Marc et al., "TIMBUKTU—The Next Best Thing to Being There," Version 2.0 User's Guide, WOS Data Systems, Inc., Lawrence, Kansas (1987).

Fish, Robert S. et al., "Quilt: A Collaborative Tool for Cooperative Writing," Conference on Office Information Systems, Palo Alto, California, Mar. 23–25, 1988, pp. 30–37.

Greif, Irene et al., "Atomic Data Abstractions in a Distributed Collaborative Editing System (Extended Abstract)," Laboratory for Computer Science Massachusetts Institute of Technology, Nov. 1985.

Greif, Irene et al., "Data Sharing in Group Work," Laboratory for Computer Science Massachusetts Institute of Technology, Oct. 1986.

Jones, Oliver, "Multidisplay Software in X: A survey of Architectures," *The X Resource*, Issue 6, O'Reilly & Associates (1993), pp. 88–113.

Kennington, R.W. et al., "A Collaborative Document Editing System," Information Technology Towards 2000, ACC '88, The Australian Computer Conference, Sep. 21–23, 1988, pp. 89–109.

Kosiur, Dave, "Communicating at Speed", *Macworld*, Jul. 1989, pp. 128–133.

Lantz, Keith A., "An Experiment in Integrated Multimedia Conferencing", Department of Computer Science, Stanford University, Stanford, California 94305, pp. 267–275.

Lantz, Keith A , "Reading 19: An Experiment in Integrated Multimedia Conferencing," *Computer–Supported Cooperative Work. A Book of Readings,* Morgan Kaufmann Publishers. Inc., 1988, pp. 533–552.

Lantz, Keith A. et al., "Virtual Terminal Management in a Multiple Process Environment," 1979, pp. 86–97.

Li, Sheng Feng et al., "Frame–buffer on Demand: Applications of Stateless Client Systems in Web–based Learning," Cambridge, UK (date unknown).

Malone, Thomas W. et al., "The information Lens: An Intelligent System for Information Sharing in Organizations," Apr. 1986, pp. 1–8.

McNeel, Richard, "Being There: Remote Networking," *Publish'*, Dec. 1988, pp. 52–57.

Nabielsky, J. et al., "A Virtual Terminal Management Model RFC 782" (1981).

Opper, Susanna, "A Groupware Toolbox," *BYTE*, Dec. 1988, pp. 275–282.

Ousterhout, John K. et al., "The Spirit Network Operating System," *COMPUTER,* Feb. 1988, pp. 23–36.

Pepper, J., "Hayes revs up its modem: V–Series features 9600–baud", *Lotus,* Jan. 1988, pp. 20–21.

Pferd, William et al., "Interactive Graphics Teleconferencing," *Computer,* vol. 12, No. 11 (ISSN 0018–9–162), Nov. 1979, pp. 62–72.

Reghbati, Hassan K. et al., "Tutorial–Computer Graphics Hardware Image Generation and Display," IEEE Press, New York, 1988, reviewed, pp. 1–17.

Richardson, Tristan et al., "The RFB Protocol," Cambridge, Version 3.3, Jan. 1998.

Richardson, Tristan et al., "Virtual Network Computing," reprint from IEEE Internet Computing, vol. 2, No. 1, Jan./Feb. 1998.

Sarin, Sunil K. et al., "Software for Interactive On–Line Conferences", pp. 1–28, Massachusetts Institute of Technology, Laboratory for Computer Science, pp. 1–28.

Sarin, Sunil K. et al., "Software for Interactive On–Line Conferences", Massachusetts Institute of Technology, Laboratory for Computer Science, Second *ACM–SIGOA Conference on Office Information Systems,* Toronto, Canada, Jun. 25–27, 1984, pp. 46–58.

Sarin, Sunil et al., "Computer–Based Real–Time Conferencing Systems," *Computer,* vol. 18, No. 10 (ISSN 0018–162), Oct. 1985, pp. 33–45.

Sarin, Sunil et al., "Reading 15—Computer–Based Real–Time Conferencing Systems," *Computer–Supported Cooperative Work: A Book of Readings,* Morgan Kaufmann Publishers, Inc., 1988, pp. 397–420.

Schaller, Mary, "Dial–Up Services: Modems Charge into the Fast Lane," *Network World,* Network World, Inc., Aug. 25, 1986, at 29, 5 pages.

Seliger, Robert, "Design and Implementation of a Distributed Program for Collaborative Editing," Sep. 30, 1985, pp. 3, 4, 7–10, 13–17, 20–75, and 153–167.

Shackel, B. (editor), "Results From Evaluation Studies With the Computer Conferencing System KOMEX," Human–Computer Interaction–Interact '84, Proceedings of the IFIP Conference organized by the Tqask Group on Human–Computer Interaction—formerly IFIP WG 6.3, London, U.K., Sep. 4–7, 1984, pp. 941–944.

Smith, John B. et al., "Hypertext," Communication of the ACM, vol. 31, No. 7, Jul. 1988, pp. 816–819.

Stefik, Mark et al., "Beyond the Chalkboard: Computer Support for Collaboration and Problem Solving in Meetings," COMMUN. ACM, Jan. 1987, at 32.

Stefik, M. et al., "WYSIWIS Revised: Early Experiences with Multiuser Interfaces," ACM Transactions on Office Information Systems, vol. 5, No. 2, Apr. 1987, pp. 147–167.

Swartz, Joe, "Apple, Third Parties Grasp for Token Ring," *MacWeek Work Station News,* vol. 3, No. 13, Mar. 28, 1989, 2 pages.

U.S. West, "Blazing New Trails in ISDN", advertising brochure, publication date unknown.

Weibel, Bob et al., "Being There: Remote," Dec. 1988, pp. 52–57.

Wiggins, Robert R., "All Systems Go; Software Review; System Tools 5.0 with MultiFinder; Evaluation," Information Access Company, A Thomson Corporation Company, Ziff–Davis Publishing Company, *MacUser*, vol. 4, No. 3, Mar. 1988, p. 126, 4 pages.

Winograd, Terry, "Groupware: The Next Wave or Just Another Advertising Slogan?," Comp.con '89, Thirty–Fourth IEEE Computer Society International Conference, Feb. 27–Mar. 3, 1989, pp. 198–200.

Yoder, Elise et al., "Collaboration in KMS, a Shared Hypermedia System," May 1989, pp. 37–42.

Greif, Irene, *Computer–Supported Cooperative Work: A Book of Readings,* published Apr. 8, 1988 by Morgan Kaufmann Publishers, Inc., San Mateo, CA (ISBN 0–934613–57–5).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–35 are cancelled.

* * * * *